US008818710B2

(12) United States Patent
Milbert et al.

(10) Patent No.: US 8,818,710 B2
(45) Date of Patent: Aug. 26, 2014

(54) METHOD AND SYSTEM FOR PROVIDING OFF-ROAD GUIDANCE

(75) Inventors: Randy L. Milbert, Saint Paul, MN (US); Erik S. Freed, Coon Rapids, MN (US); Kyle K. Estes, Minneapolis, MN (US)

(73) Assignee: Primordial, Inc., Saint Paul, MN (US)

( * ) Notice: Subject to any disclaimer, the term of this patent is extended or adjusted under 35 U.S.C. 154(b) by 1197 days.

(21) Appl. No.: 12/307,441

(22) PCT Filed: Jul. 3, 2007

(86) PCT No.: PCT/US2007/015389
§ 371 (c)(1),
(2), (4) Date: Aug. 28, 2009

(87) PCT Pub. No.: WO2008/005454
PCT Pub. Date: Jan. 10, 2008

(65) Prior Publication Data
US 2010/0063731 A1   Mar. 11, 2010

Related U.S. Application Data

(60) Provisional application No. 60/818,335, filed on Jul. 5, 2006.

(51) Int. Cl.
*G01C 21/32* (2006.01)
*G01C 21/20* (2006.01)
(52) U.S. Cl.
CPC ................................ *G01C 21/20* (2013.01)
USPC .......... 701/411; 701/400; 701/408; 701/409; 701/417; 701/454; 340/995.19
(58) Field of Classification Search
CPC combination set(s) only.
See application file for complete search history.

(56) References Cited

U.S. PATENT DOCUMENTS 4,702,201 A * 10/1987 Odo et al. ............. 123/2
5,031,104 A    7/1991 Ikeda et al.
(Continued)

FOREIGN PATENT DOCUMENTS

| CA | 2583458 | 7/1991 |
|----|---------|--------|
| EP | 1477770 | 11/2004 |
| WO | WO2004029551 | 4/2004 |

OTHER PUBLICATIONS

Park et al. "A turn-by-turn navigation system for automotive telematics terminals," Intelligent Vehicles Symposium, 2003, Proceedings. IEEE, pp. 21-24.

*Primary Examiner* — Khoi Tran
*Assistant Examiner* — Jonathan L Sample
(74) *Attorney, Agent, or Firm* — Faegre Baker Daniels LLP

(57) ABSTRACT

The present invention is a computer-implemented system for providing guidance information to aid a user in traveling along an off-road route. This system assumes that the route has already been determined. Also, it is assumed that the user's position and orientation can be determined, for example using existing techniques such as the global positioning system (GPS). The present invention uses a Look-Ahead-Point Finder (100) to find a point, which we refer to as a look-ahead point, located on the route ahead of the user's current location. A Guidance Message Constructor (102) and a Guidance Presenter (106) are used to present the user with guidance information directing him towards the look-ahead point. If the user is already headed towards the look-ahead point, then a Turn Analyzer (108) is used to search the route in order to find the next turn location. If the user is found to be nearing a turn, then the Guidance Message Constructor (102) and the Guidance Presenter (106) are used to give the user information about the turn including its distance and direction.

28 Claims, 14 Drawing Sheets

(56) References Cited

U.S. PATENT DOCUMENTS

| | | | |
|---|---|---|---|
| 5,471,205 A * | 11/1995 | Izawa | 340/995.27 |
| 5,543,802 A | 8/1996 | Villevieille et al. | |
| 5,646,855 A | 7/1997 | Jones et al. | |
| 5,736,941 A | 4/1998 | Schulte et al. | |
| 5,902,349 A * | 5/1999 | Endo et al. | 701/417 |
| 5,977,667 A * | 11/1999 | Hirose | 310/51 |
| 6,356,837 B1 * | 3/2002 | Yokota et al. | 701/411 |
| 6,466,868 B2 | 10/2002 | Sakashita | |
| 6,519,528 B2 | 2/2003 | Endo et al. | |
| 6,577,950 B2 | 6/2003 | Shimazu | |
| 6,751,551 B2 | 6/2004 | Katayama et al. | |
| 6,836,725 B2 * | 12/2004 | Millington et al. | 701/454 |
| 7,549,403 B2 * | 6/2009 | Yamamoto et al. | 123/41.7 |
| 2003/0158660 A1 * | 8/2003 | Krull et al. | 701/209 |
| 2004/0024524 A1 | 2/2004 | Miyazawa | |
| 2004/0167715 A1 * | 8/2004 | Miwa | 701/213 |
| 2004/0210388 A1 * | 10/2004 | Sugiura | 701/209 |
| 2004/0220730 A1 * | 11/2004 | Chen et al. | 701/210 |
| 2005/0267681 A1 * | 12/2005 | Yato | 701/210 |
| 2006/0052935 A1 | 3/2006 | Nakayama et al. | |
| 2006/0116814 A1 * | 6/2006 | Milbert | 701/209 |
| 2006/0247849 A1 * | 11/2006 | Mohsini et al. | 701/206 |
| 2007/0124069 A1 | 5/2007 | Nakayama et al. | |
| 2008/0040035 A1 | 2/2008 | Emoto et al. | |
| 2008/0070559 A1 | 3/2008 | Behr et al. | |
| 2010/0063731 A1 * | 3/2010 | Milbert et al. | 701/211 |
| 2010/0094496 A1 * | 4/2010 | Hershkovitz et al. | 701/22 |

* cited by examiner

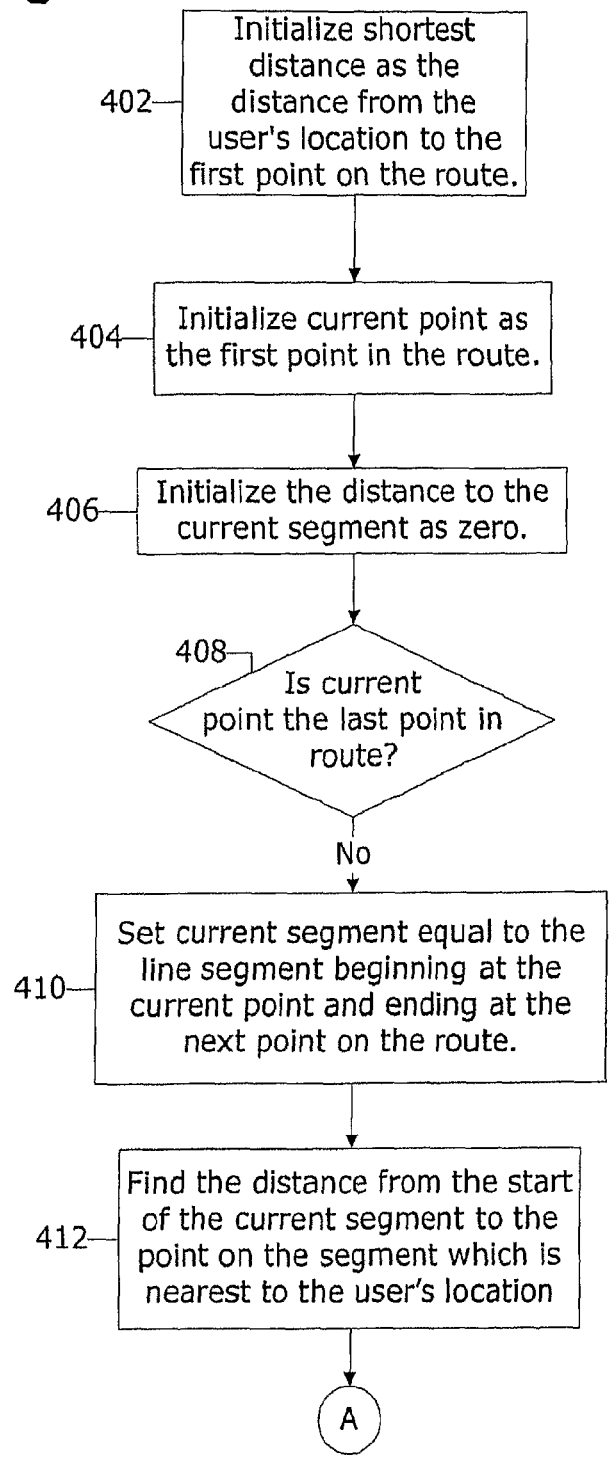

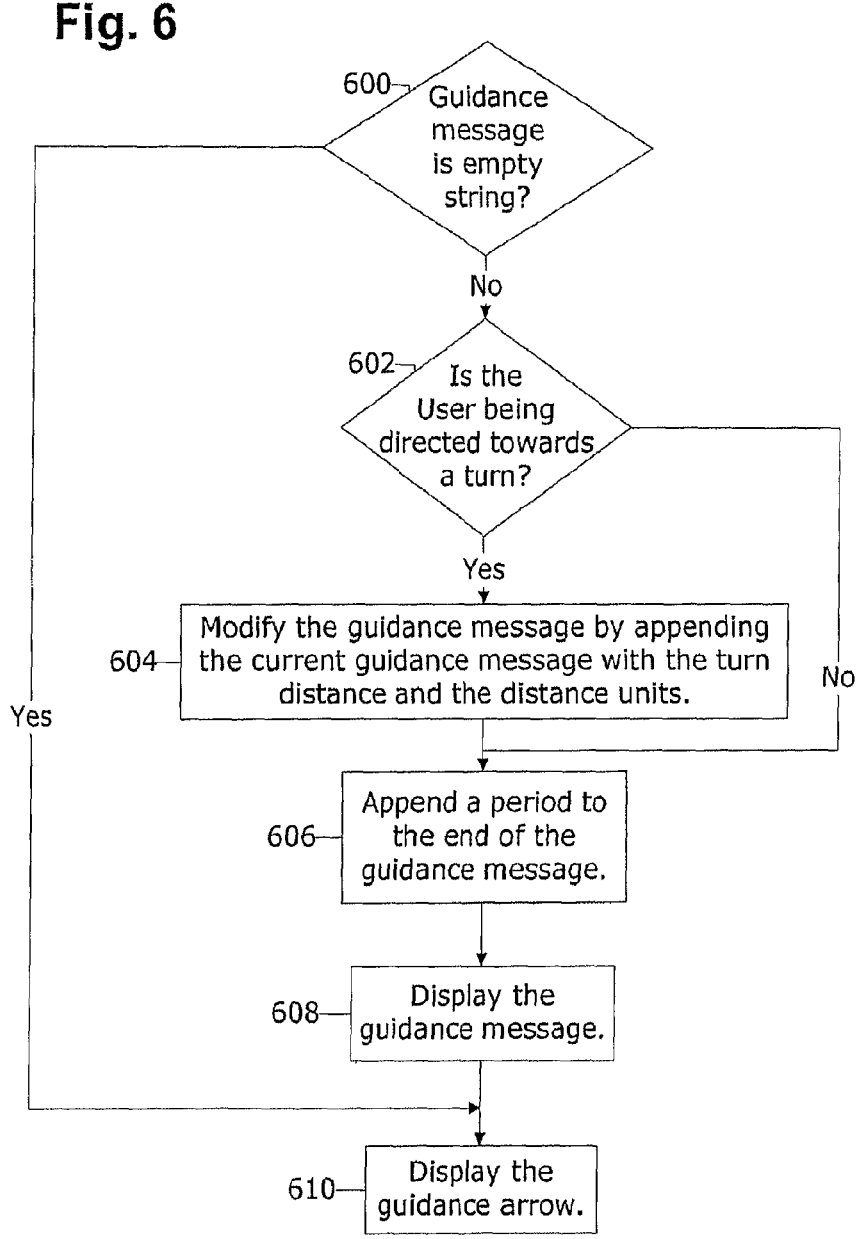

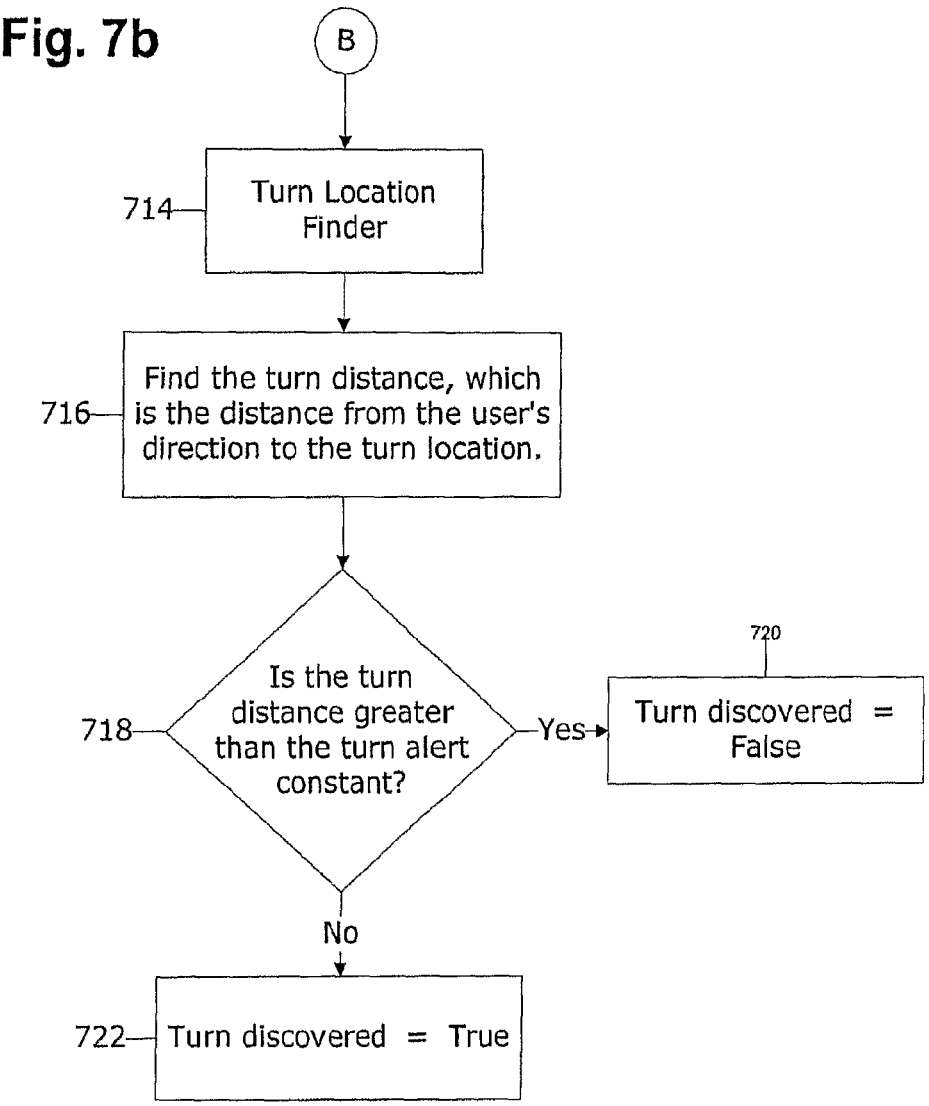

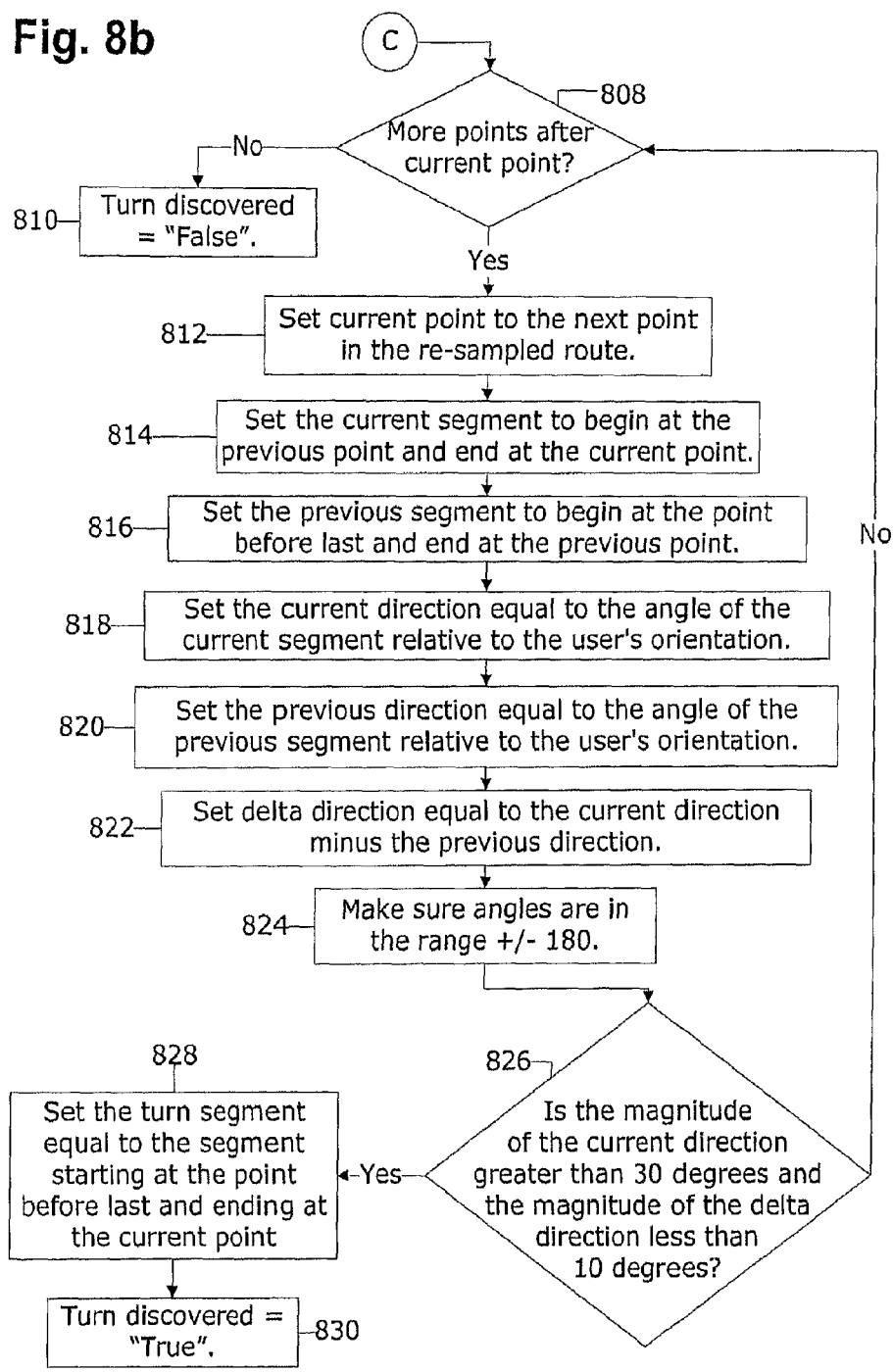

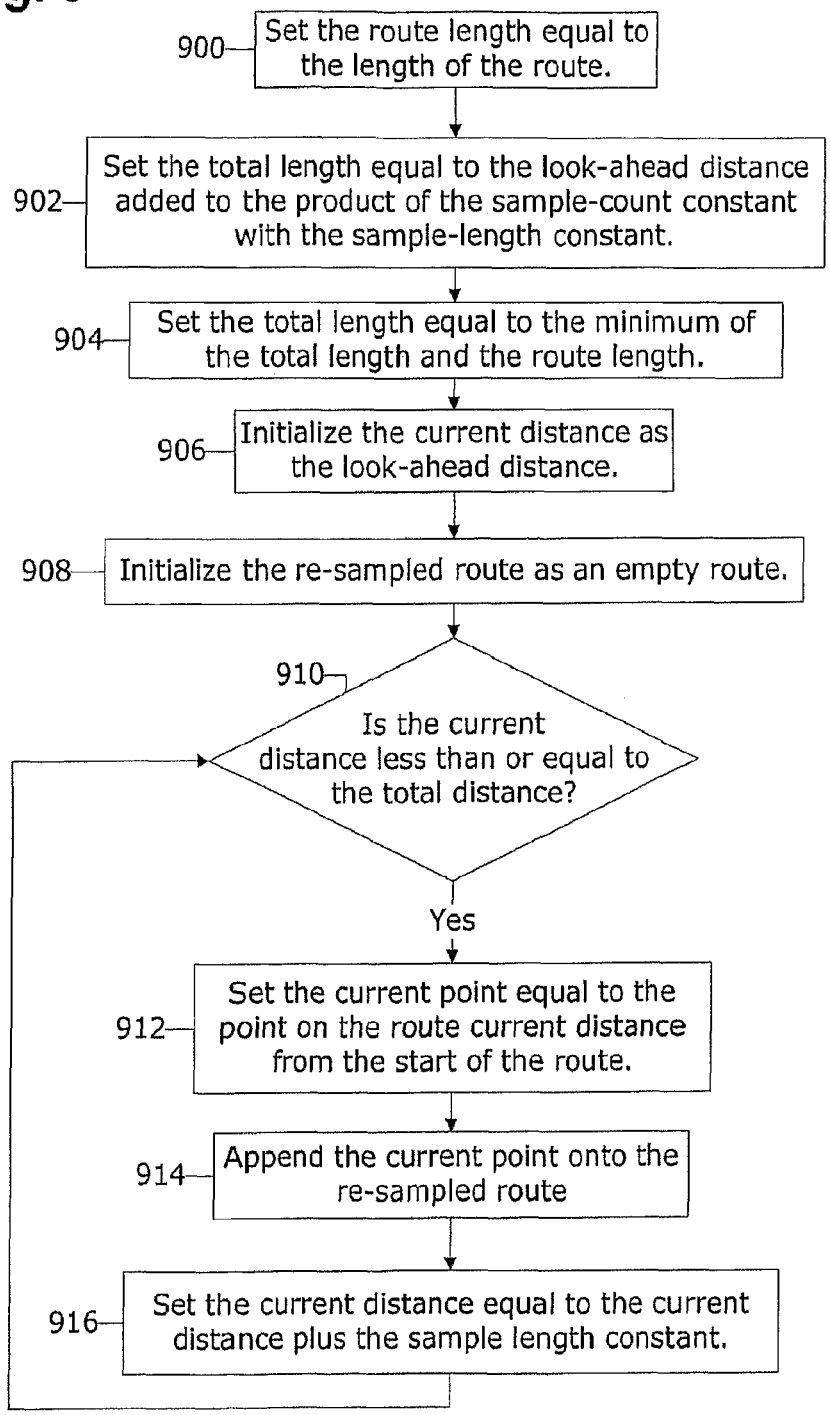

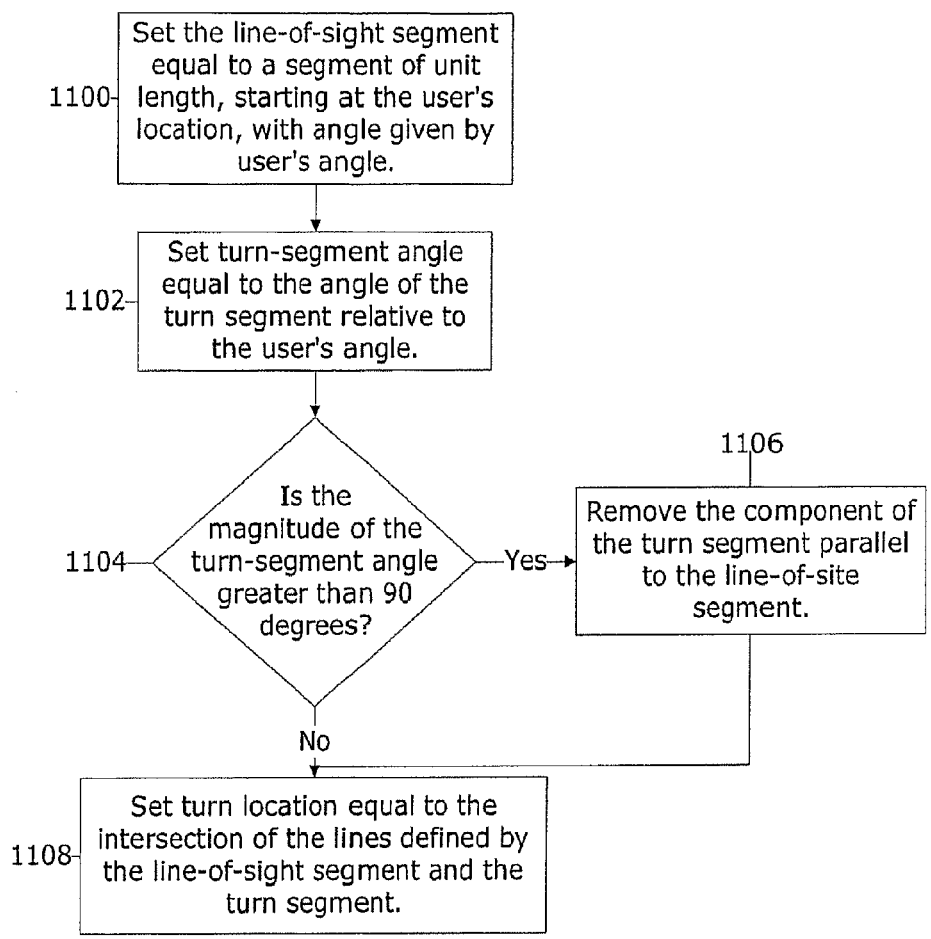

METHOD AND SYSTEM FOR PROVIDING OFF-ROAD GUIDANCE

BACKGROUND OF INVENTION

1. Field of the Invention

This invention relates to navigation, specifically to determining and presenting guidance information to a user traveling off-road.

2. Discussion of Prior Art

There are countless situations in which individuals are required to navigate an area that has neither roads nor street signs. Everyday, soldiers navigate battlefields, geocachers survey parks, and hikers traverse campgrounds. U.S. Pat. No. 6,963,800 to Milbert discloses a system for generating off-road routes, but there is currently no adequate system for intuitively guiding individuals along these off-road routes.

There are many systems which can provide turn-by-turn guidance to direct a user along a route which follows existing roads and streets. Such systems generally offer detailed auditory or visual information directing users towards their destination, often including natural language instructions. Prior to the present invention, existing systems which have attempted to provide analogous functionality in the off-road case have each suffered from a number of disadvantages. Before discussing these systems, we will begin with a brief description of on-road navigation systems.

On-Road Navigation

Commercial entities have enjoyed considerable success developing systems to guide users along routes which follow existing roadways. One popular example is the Hertz NeverLost™ vehicle navigation system, which notifies users as they approach each turn on their route. Hertz NeverLost also provides natural language auditory messages indicating the distance and direction of the turn and includes a three-dimensional arrow which allows the user to visualize the turn direction.

There have been a number of patents for systems which are similar to Hertz NeverLost™. For example:

U.S. Pat. No. 6,577,950 to Shimazu discloses a low-cpu system for on-road navigation.

U.S. Pat. No. 5,736,941 to Schulte et. al. discloses a system for on-road navigation which offers verbal commands.

U.S. Pat. No. 6,466,868 to Sakashita discloses a system for on-road navigation which is able to handle branching intersections in a more user-friendly way.

Existing Off-Road Systems

Various attempts were made to develop off-road guidance systems, although such systems have been fairly limited in comparison to on-road systems. The simplest solution for navigating a user off-road is to simply display an off-road route overlaid with the user's location without offering further guidance information. For example:

U.S. Pat. No. 6,356,837 to Yokota et. al. discloses a system which overlays off-road routes with the user's location on a display screen. The off-road routes are recorded during previous off-road trips taken by the user.

U.S. Pat. No. 6,519,528 to Endo et. al. discloses a system which overlays user-location onto a map. This system handles the on-road case as well and automatically detects when a user has left the road system, such as by entering a parking lot.

Fortunately, inventors have developed a number of off-road systems which are able to offer significantly more useful guidance information than the above methods. This is generally accomplished by directing users towards a series of intermediate waypoints. In order to guide users along a route, information is displayed indicating the direction and distance to the current waypoint. Once users are satisfied that they have reached a given waypoint, they can choose to move on to the next waypoint. An example system of this type is given by:

U.S. Pat. No. 6,751,551 to Katayama et. al. discloses a system which displays an arrow to guide a user along an off-road path. The primary claim of this system is that it offers a small display area suitable to smaller vehicles such as all-terrain vehicles (ATVs). The user presses a button to begin heading towards the next waypoint.

It is far from ideal to require the user to choose each successive waypoint along a route by hand, since this takes time and distracts the user's attention. To remedy this issue, systems have been developed which automatically assign the next waypoint by detecting when the current waypoint has been reached. This is generally accomplished by assigning a threshold radius around each waypoint. Once the user is within the threshold distance of the current waypoint, the system reassigns the current waypoint to be the next waypoint on the route. For example:

U.S. Pat. No. 6,836,725 to Millington et. al. discloses a system which uses fixed waypoints to guide a user off-road. The system provides directional arrows and non-verbal audible cues indicating that the current waypoint has been reached (to within a threshold radius).

U.S. Pat. No. 5,543,802 to Villevielle et. al. discloses a static waypoint system of which the primary claim is the ability to reverse routes, so that users may return to their starting point.

U.S. Pat. No. 5,646,855 to Jones et. al. discloses a system which also uses fixed waypoints to guide the user. This method uses a slight variant of the more typical waypoint methods described above. In particular, instead of directing users directly towards a waypoint, they are directed towards the perimeter of a circle centered at the waypoint. This allows users to avoid physical waypoints such as buoys.

While these systems are an improvement over methods which require manual intervention to set the current waypoint, they still have a number of disadvantages due to the fact that they rely on fixed waypoint locations and arbitrary threshold distances around each waypoint. These disadvantages will be discussed in more detail in the next section. In addition to these issues, a significant feature of existing on-road systems which has not yet been reproduced in off-road systems is user-notification as to the direction of the next turn in the route (i.e. turn-by-turn guidance). In particular, off-road systems generally focus solely on getting the user to the next waypoint and don't provide information about what direction the user will have to turn at the next waypoint (if a turn is required at all). One system which does attempt to offer such information is U.S. Pat. No. 6,751,551 to Katayama et. al., which displays both the direction to the current waypoint and also the direction of the next turn. However, this system is not completely off-road in the sense that for the purposes of providing turn information, it assumes that trail information is available. The turns are then given by the "crossing" and "branch" points (his terminology) in the trail.

PRIOR ART DISADVANTAGES

The present invention includes recognition that existing off-road navigation systems suffer from the following disadvantages:

a. The performance of existing systems depends crucially on the locations of static waypoints, but existing systems do not ensure that the locations will be optimal for guidance purposes. In fact, they are often chosen arbitrarily by the user.

b. If the waypoints are too close together, the user's trajectory tends to oscillate back and forth across the intended route. On the other hand, if the waypoints are too far apart and the user happens to be off-course, then rather than directing the user to get back on course, existing systems direct the user towards the next distantly spaced waypoint (possibly taking the user through obstructions, etc.).

c. Another serious problem with static waypoint systems is that they require the user to move within an arbitrary distance to each waypoint before heading on to the next waypoint. This means that if a user cuts through a turn early (before the radius threshold is reached), then the user is directed backwards towards the waypoint until it is reached.

d. The previous disadvantage applies in a variety of situations such as when users accidentally turn earlier than intended because they are slightly off-course, or when users who are in a hurry purposefully cut through a turn. In either case, existing systems require that these users backtrack (or manually update the waypoint) until the waypoint is actually reached, rather than simply allowing users to continue on route.

e. If users accidentally backtrack, then previously passed waypoints are not available for guidance unless users recognize that they have backtracked and reset the waypoints manually.

f. If a user is off-course, then if the current waypoint is close to the nearest point on the route to the user, then the user is directed to move perpendicular to the route. In such cases, it would be more efficient to direct the user diagonally, towards the route but also forward along the route.

g. Another serious problem with existing off-road systems is that they do not give the user notification regarding the next turn along the route. Most on-road navigation system, on the other hand, do indicate the direction and distance to the next turn.

h. As mentioned above, Katayama et. al. attempts to deal with the previous disadvantage, but his system requires that "branch" and "crossing" points in the "trail" are known. This information is not always available, particularly in truly off-road situations in which no "trail" is present.

It is possible that existing static waypoint systems could be modified to address disadvantages g) and h). However, such modified systems would still suffer from the following disadvantages:

i. If a system assumes that each waypoint is a turn, then the waypoints may not be optimally spaced for guidance.

j. If each waypoint is not necessarily a turn, then the turn locations need to be found by searching the route. No systems exist for finding turn locations along an off-road route.

OBJECTS AND ADVANTAGES

The present invention offers numerous advantages over the prior art:

a. The performance of the present system does not depend on the locations of arbitrarily placed static waypoints. Instead, the current waypoint location (which we refer to as the look-ahead point) is set dynamically based on the user's location relative to the route.

b. By choosing a reasonable value for a single constant parameter, namely the distance to the look-ahead point, the present method ensures that the current look-ahead point is always an optimal distance from the user.

c. The user does not have to reach within an arbitrary radius of the current waypoint in order to move on to the next waypoint. Instead, the look-ahead point is constantly updated to reflect the user's current location relative to the route.

d. The previous advantage implies, for example, that if users cut through a turn early, they are not required to back track in order to reach a waypoint located at the turn. Instead, the look-ahead point is automatically updated to correspond to the user's current location.

e. Also, if a user accidentally backtracks, then the look-ahead point is automatically set to a location on the route near the user (which the user may have already passed). There is no issue in the present invention that previously passed waypoints are not be available for guidance.

f. The look-ahead point is always set at a location somewhat ahead of the user on the route. This means that the user is not directed to travel perpendicular to the route, as can happen in existing systems when the current waypoint happens to be (approximately) the nearest point on the route to the user.

g. In analogy with existing on-road systems, the present invention notifies the user regarding the next turn in the route. In particular, once the user gets sufficiently close to a turn in the route, the system tells the user the distance and direction of the turn.

h. The system used by the present system to find the next turn in the path does not assume that "branch" and "cross" points in the "trail" are known. This information is not necessarily available, particularly in truly off-road situations in which no "trail" is present.

i. The system used to determine the next turn location does not assume that the turns simply correspond to the static waypoint locations (there are no static waypoint locations in the present invention).

j. The present invention includes a method for searching the route to find the next turn location in an off-road route. This method is able to accurately adjust the estimate of the distance to the turn, taking into account the fact that the user's current orientation may be somewhat off-course.

Additional advantages of the present invention will become apparent from consideration of the ensuing description and drawings.

SUMMARY OF INVENTION

The present invention is a computer-implemented system for providing guidance information to aid a user in traveling along an off-road route. This system assumes that the route has already been determined, possibly using U.S. Pat. No. 6,963,800 to Milbert or some other system for generating off-road routes. Also, it is assumed that the user's position and orientation can be determined, for example using existing techniques such as the global positioning system (GPS).

The system begins by determining a location, similar to a waypoint, which we refer to as a look-ahead point. The look-ahead point is a location on the route ahead of the user's current location. In one preferred embodiment, the look-ahead point is located a fixed threshold distance ahead of the nearest point on the route from the user. If the user is currently off-route from the look-ahead point, then the user is presented with guidance information directing her towards the look-ahead point.

On the other hand, if the user is currently on-route to the look-ahead point, then the system searches the route in order to find the next turn location. If the user is found to be nearing a turn, then the system gives the user advanced warning about the turn including information regarding the distance and/or direction of the turn.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF DRAWINGS

The embodiments of the present invention are illustrated by way of example, and not by way of limitation, in the figures of the accompanying drawings and in which like reference numerals refer to similar elements and in which.

Overall method for providing off-road turn guidance. Shows guidance information on a display screen to aid a user in moving along a predetermined route.

Figure 2:
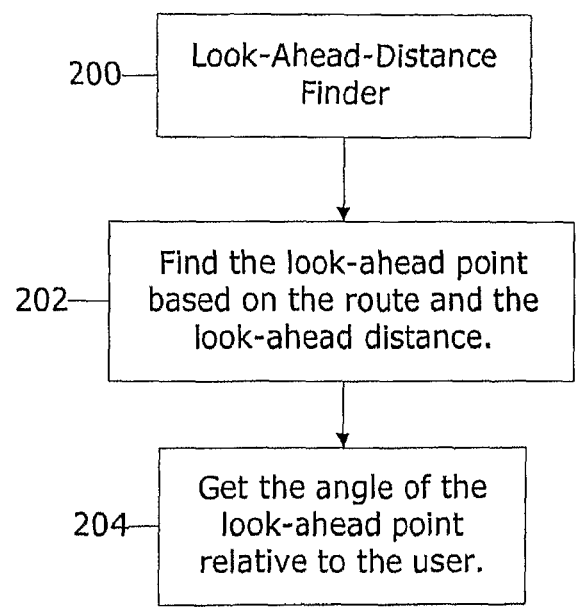

FIG. 2: Look-Ahead-Point Finder

Finds a point along a route that is located ahead of the user. This is the look-ahead point.

Figure 3:
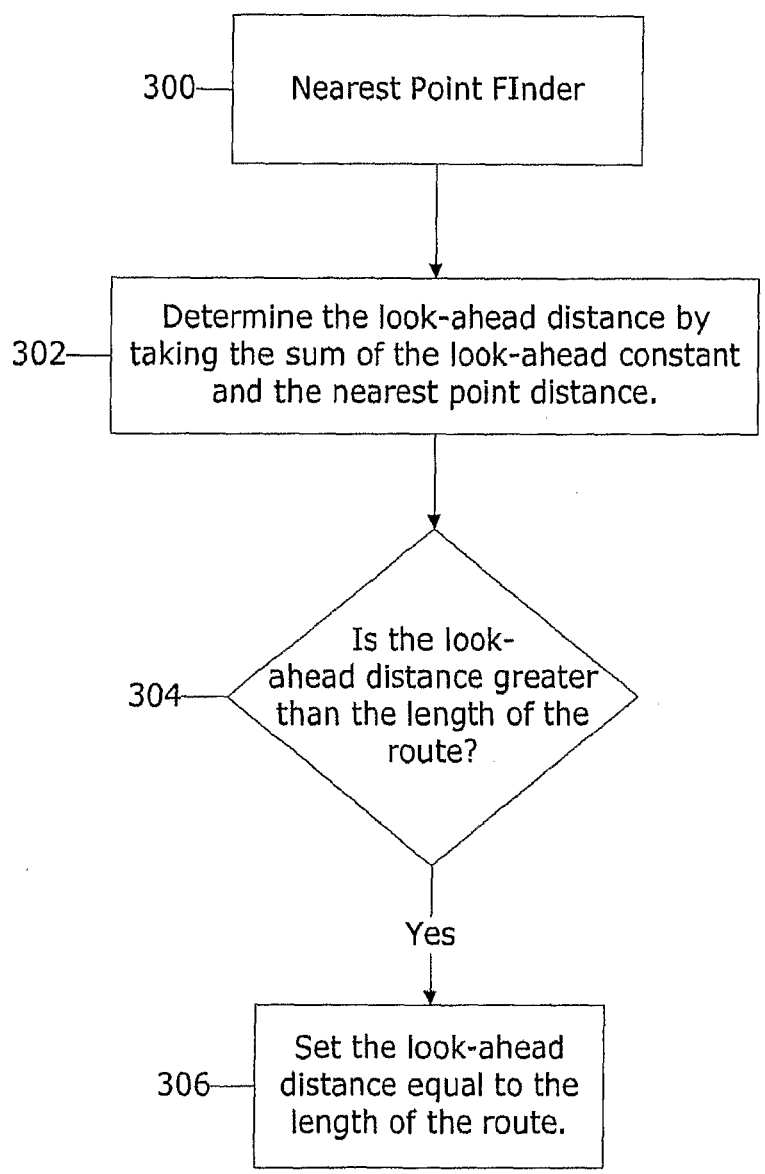

FIG. 3: Look-Ahead-Distance Finder

Finds the distance along a route to the look-ahead point.

FIG. 4a: Nearest Point Finder

Finds a point on a route nearest to the user's location.

Figure 4B:
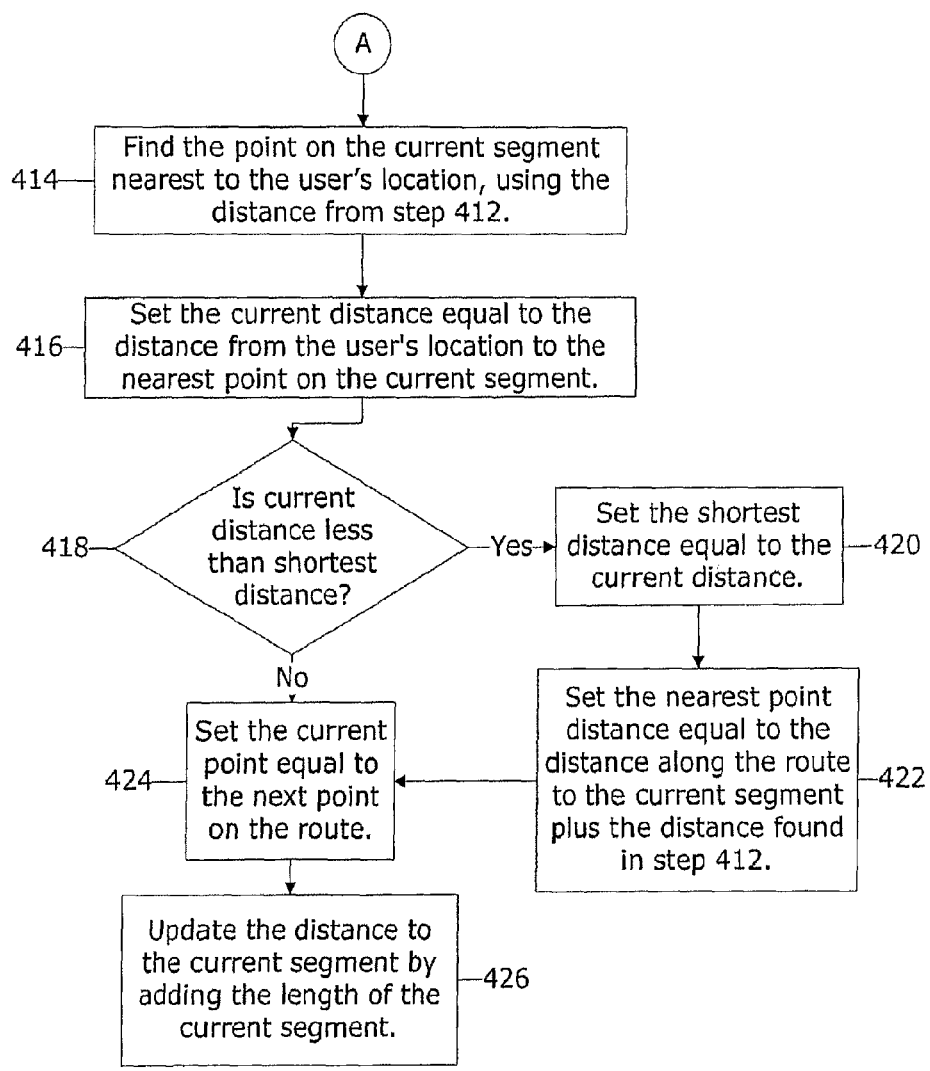

FIG. 4b: Nearest Point Finder

Continuation of FIG. 4a.

Figure 5:
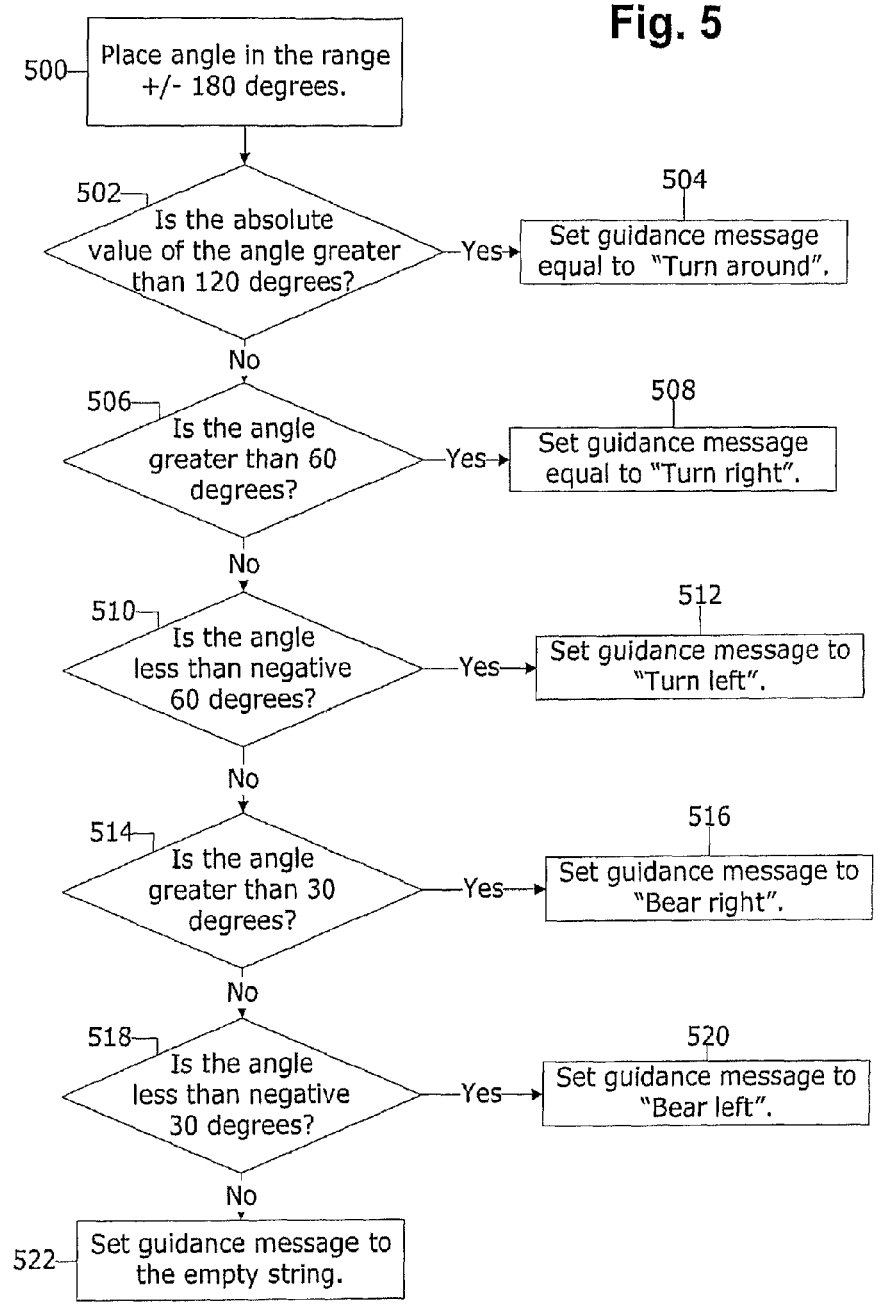

FIG. 5: Guidance Message Constructor

Converts a numerical angle into a qualitative description of what the user should do.

FIG. 6: Guidance Presenter

Displays appropriate guidance information to the user.

Figure 7A:
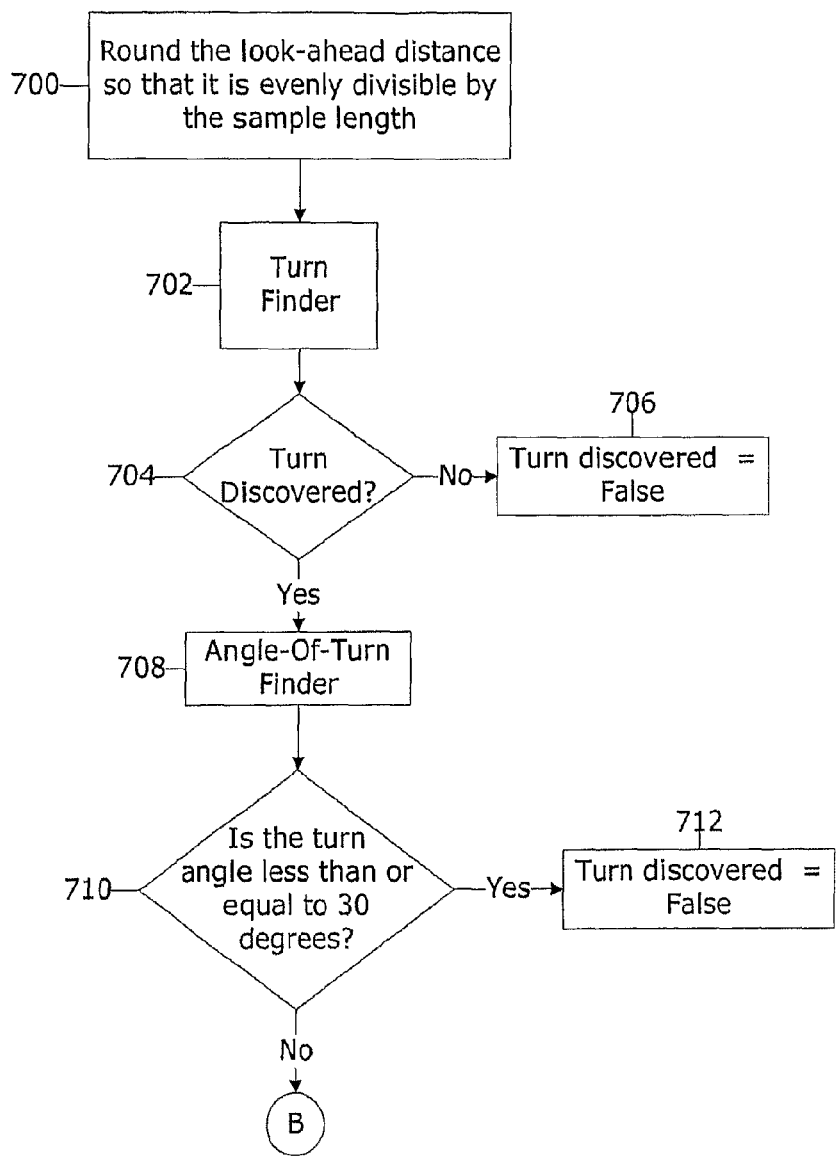

FIG. 7a: Turn Analyzer

Locates the next turn along a route, and finds the distance and angle of the turn relative to the user.

FIG. 7b: Turn Analyzer

Continuation of FIG. 7a.

Figure 8A:
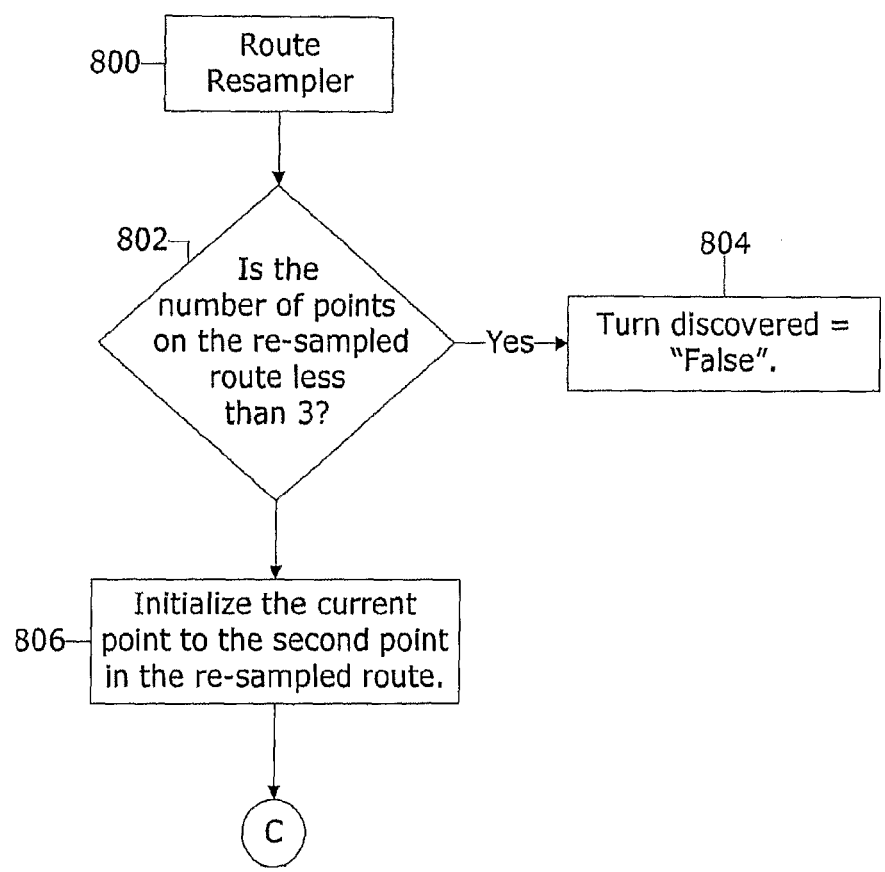

FIG. 8a: Turn Finder

Locates the next turn along a route.

FIG. 8b: Turn Finder

Continuation of FIG. 8a.

FIG. 9: Route Resampler

Resamples the route into a uniformly spaced sequence of points, starting at the look-ahead point.

Figure 10:
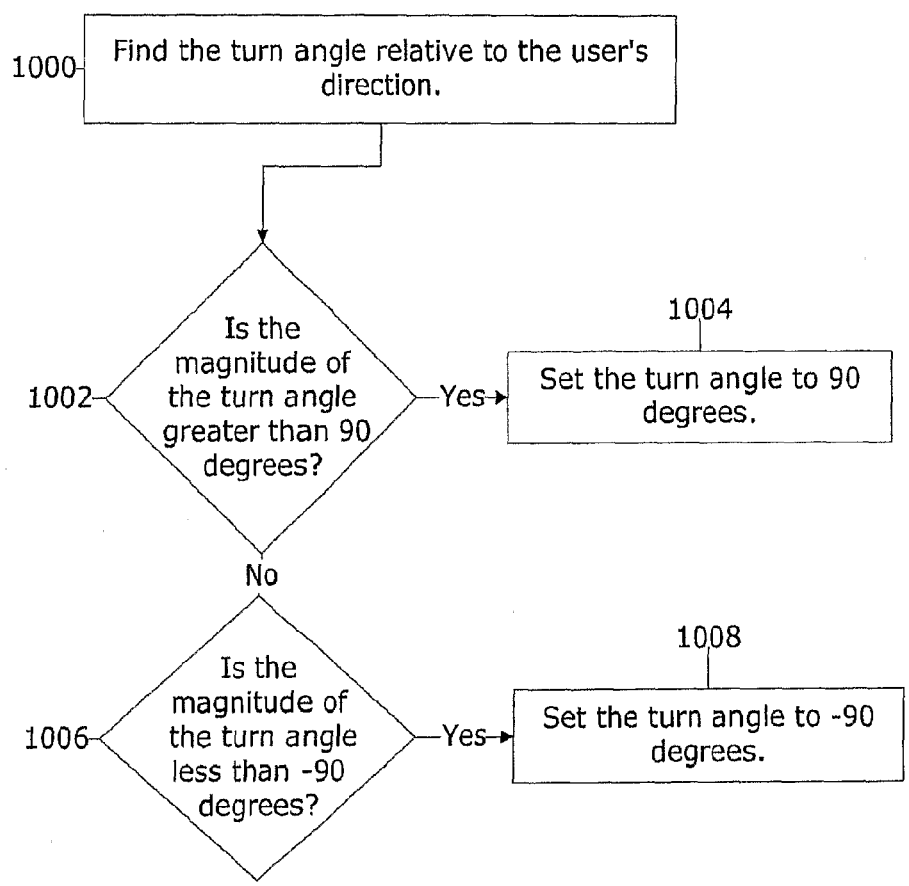

FIG. 10: Angle-Of-Turn Finder

Finds the angle of the next turn.

FIG. 11: Turn Location Finder

Finds the distance to the next turn.

DETAILED DESCRIPTION OF THE PREFERRED EMBODIMENTS

Figure 1:
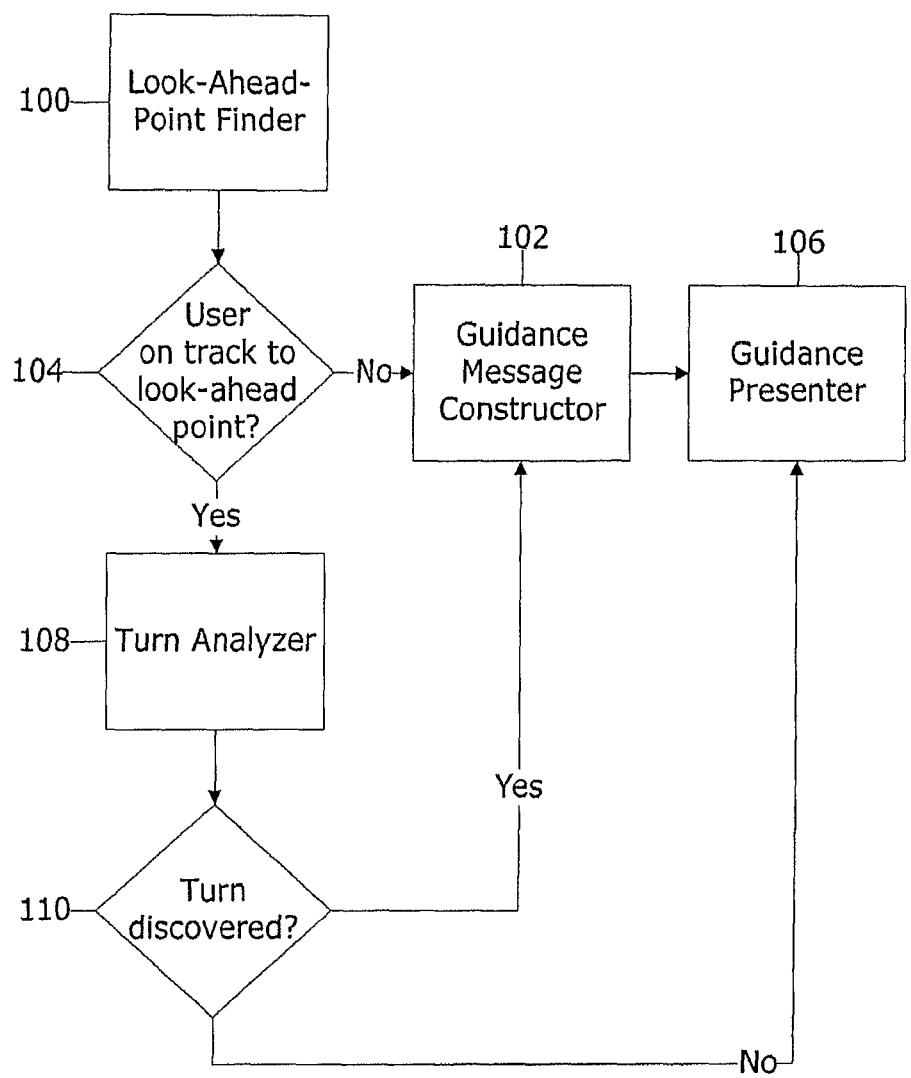
FIG. 1: Turn Guidance

FIG. 1 shows a block diagram of a preferred embodiment of the present invention. This invention takes the following data inputs: a route, a user's location, and a user's orientation. Based on these inputs, the software graphically displays guidance information. The user's location is a two-dimensional vector in Cartesian coordinates. The user's orientation is given in degrees, measured +/−180 from the positive y-axis, with positive angles measured clockwise from the y-axis. The route is given by an array of points each represented by two-dimensional Cartesian vectors, with the first point in the route corresponding to the first element in the array.

The present invention begins by invoking the Look-Ahead-Point Finder 100. The Look-Ahead-Point Finder 100 takes the user's location, the user's orientation, and the route as inputs. The Look-Ahead-Point Finder 100 then processes these inputs and returns a look-ahead point, a look-ahead distance, and a look-ahead angle. The look-ahead point is a point on the path ahead of the user's location. The look-ahead distance is measured along the route from the start of the route to the look-ahead point. The look-ahead angle is the angle to the look-ahead point measured +/−180 degrees from the user's line of sight (which is a vector located at the user's location, with angle given by the user's orientation).

Next, step 104 checks to see if the user is on track towards the look-ahead point. In particular, step 104 considers the user to be on track to the look-ahead point if the absolute, value of the look-ahead angle is less than or equal to 30 degrees (it will be appreciated by one skilled in the art that a value other than 30 degrees could be used instead).

If step 104 finds that the user was not on track towards the look-ahead point, then the Guidance Message Constructor 102 is invoked. In this case, the Guidance Message Constructor 102 receives the look-ahead angle as an input and returns a guidance message, which is a qualitative description of what the user should do (e.g. "Turn right" or "Turn around"). The next step is the Guidance Presenter 106. The Guidance Presenter 106 takes as inputs, the guidance message, the look-ahead angle, and a Boolean input value which should be set equal to "True" if the user is being directed towards a turn and "False" otherwise. In this case, the Boolean value is set to "False" since the user is going to be directed towards the look-ahead point. The Guidance Presenter 106 also takes as input a distance; however, this input value is ignored in this case because the Boolean input value is set to "False" (see the detailed description of the Guidance Presenter 106 below for further explanation). Based on these inputs, the Guidance Presenter 106 displays the guidance message onto the user's display screen. Also, the Guidance Presenter 106 displays an arrow to the user's screen with angle given by the look-ahead angle. This arrow is shown +/−180 degrees from the vertical on the display screen.

If on the other hand step 104 found that the user was already on track towards the look-ahead point, then the next step is the Turn Analyzer 108. The Turn Analyzer 108 takes inputs, the user's location, the user's orientation, the look-ahead distance, and the route. The Turn Analyzer 108 then returns a turn distance, a turn angle, and a Boolean value equal to "True" if a turn is found by the Turn Analyzer 108 and "False" otherwise. The turn distance gives the estimated distance from the user's location to the next point at which the user will be required to turn. The turn angle gives the angle of the turn measured +/−90 degrees from the user's line of sight. If the Boolean output value is set to "False", then the other two output values are no longer relevant since no turn was found.

Next, step 110 checks to see if a turn was detected based on the Boolean output value from the Turn Analyzer 108. If a turn was not detected then, the user is directed towards the look-ahead point. In particular, the Guidance Presenter 106 is invoked, with the Boolean value indicating whether the user is being directed towards a turn set to "False", the guidance message set equal to the empty string i.e. a string of characters of zero length, and the angle set to the look-ahead angle (as above the distance input is ignored since the Boolean input is "False"). The result of the Guidance Presenter 106 is a display directing the user towards the look-ahead point. Note that since the guidance message input is set to the empty string, there is no text or verbal message displayed in this case.

If on the other hand step 110 does find that a turn was detected, then the next step is the Guidance Message Constructor 102, with the turn angle (from the Turn Analyzer 108) as input. The Guidance Message Constructor 102 then returns a guidance message, a qualitative description of what the user should do once the next turn is reached e.g. "Turn right" or "Turn around". Finally, the Guidance Presenter 106 is invoked, with inputs set equal to the guidance message, the turn angle, the turn distance, and the Boolean input value set equal to "True" since a turn has been detected. Based on these inputs, the Guidance Presenter displays a message such as "Turn right 30 meters." or "Bear left 10 meters." In other words, the guidance message and the turn distance are concatenated, and the units are appended to the end. Also, an arrow is displayed to the display screen with angle given by the turn angle. This arrow is displayed +/−180 degrees relative to the vertical of the user's display screen.

Look-Ahead-Point Finder

FIG. 2 shows a preferred embodiment of the Look-Ahead-Point Finder 100. The Look-Ahead-Point Finder 100 begins by invoking the Look-Ahead-Distance Finder 200. This module finds the look-ahead distance, which as described above is the distance to the look-ahead point measured along the route from the start of the route.

Next, at step 202, the look-ahead point is determined from the look-ahead distance. In particular, the route array is searched in order to find the point lying on the route located look-ahead distance from the start of the route. Note that this point does not necessarily correspond to one of the points in the route array, but rather is sometimes located between two adjacent route points.

Next, at step 204, the look-ahead angle is determined. The look-ahead angle is the angle to the look-ahead point relative to the user. The first step in finding this angle is to take the look-ahead point minus the user's location (using standard vector subtraction) and place the result in a vector (x, y). Next, the angle of the look-ahead point relative to the y-axis can be computed using the equation: angle=arctan(x, y). Next, the look-ahead angle is given by the equation: look-ahead angle=angle−user's orientation, where the user's orientation is the angle of the user's line of sight measured relative to the y-axis. Finally, the look-ahead angle is adjusted to ensure that its values are in within the range +/−180 degrees (e.g. 190 degrees is really just −170 degrees). Placing an angle in the range +/−180 can be performed as follows. First, set the angle equal to the angle mod 360, where mod refers to the standard modulo function from mathematics (e.g. 4 mod 3=1 and −4 mod 3=−1). This correctly limits the angle to the range +/−360. Next, if the angle is less than or equal to −180, then add 360 to the angle. Otherwise, if the angle is greater than 180, then subtract 360 from the angle. Now, the angle should be in the range +/−180 (though the direction it refers to relative to the y-axis should not have changed due to these operations).

To better understand the Look-Ahead-Point Finder 100, consider an example in which the user's location is (2, 5), the user's orientation is 90 degrees (from the y-axis), and the route consists of the sequence of points {(0,0), (0,4), (4,4)}. Also, the Look-Ahead-Distance Finder makes use of a constant value, which we shall refer to as the look-ahead constant. For this example, assume that the look-ahead constant is equal to 1 meter (note that it is equal to 14 meters in a preferred embodiment as described below). The Look-Ahead-Point Finder 100 begins by using the Look-Ahead-Distance Finder 200 to find the look-ahead distance, which in this case is 7.

Next, step 202 finds the point along the route look-ahead distance from the start of the route. The first step in accomplishing this is to loop through each line segment in the route, stopping once the sum of the lengths of the segments reached thus far exceeds the look-ahead distance. In this case, the first segment in the route is {(0,0), (0,4)}. The length of this segment is given by the standard Euclidean distance formula:

$$d = \sqrt{(x_1-x_2)^2 + (y_1-y_2)^2} = \sqrt{(0-0)^2 + (0-4)^2} = \sqrt{16} = 4$$

This is less than the look-ahead distance, so we continue to the next line segment, which is {(0,4), (4,4)}. The length of this line segment is also 4 (using the same equation). Adding together the segment lengths reached thus far yields 4+4=8, which exceeds the look-ahead distance, so we stop looping through the segments. Next, we find the distance along the route to the current segment in the loop by subtracting the length of the current segment from the total summation (currently 8); this yields 8−4=4. Next, the distance along the current segment to the point we are looking for is equal to the look-ahead distance minus the distance to the current segment, which in this case is 7−4=3. We now have to find the point located a distance of 3 from the start of the current segment. Using basic linear algebra, this point is given by:

segment start+(segment end−segment start)*(distance/segment length), where the distance is 3 in this case. This yields (0, 4)+(4−0, 4−4)*(3/4)=(0, 4)+(3, 0)=(3, 4). So the look-ahead point is (3, 4).

Next, step 204 determines the angle of the look-ahead point relative to the user's orientation. First, we find the look-ahead point minus the user's location, which in this case is (3, 4)−(2, 5)=(1, −1). Next we find the angle of this vector relative to the y-axis, as angle=arctan(1, −1)=135 degrees (make sure that your arctan function outputs degrees rather than radians). Next, we subtract the user's orientation, which gives 135−90=45 degrees. This is in the range +/−180, so we are done. The look-ahead angle is 45 degrees.

Look-Ahead-Distance Finder

FIG. 3 shows a preferred embodiment of the Look-Ahead-Distance Finder 200. The Look-Ahead-Distance Finder 200 begins by invoking the Nearest Point Finder 300. The Nearest Point Finder 300 is used to compute the nearest point distance, which is the distance (measured along the route) to the point on the route nearest to the user's location. Next, in step 302, the look-ahead distance is determined as the sum of the nearest point distance and the look-ahead constant, where the look-ahead constant is set equal to 14 meters in one preferred embodiment. The next step, 304, checks to see if the look-ahead distance is greater than the length of the route. If it is, then the look-ahead distance is set equal to the route length. Otherwise, the look-ahead distance is left as is.

To better understand the Look-Ahead-Distance Finder 200, consider an example in which the user's location is (2, 5), the user's orientation is 90 degrees (from the y-axis), and the route consists of the sequence of points {(0,0), (0,4), (4,4)}. Also, for simplicity, assume that the look-ahead constant is equal to 1. The first step is to find the nearest point distance using the Nearest Point Finder 300. In this case the nearest point distance is 6 (i.e. the nearest point is 6 units from the start of the route). Next, step 302 finds the sum of the look-ahead constant and the nearest point distance, which in this case is 1+6=7. Next, step 304 checks to see if the look-ahead distance is greater than the length of the route (8 in this case). It is not, so the look-ahead distance remains as 7. By the way, the route length can be found by summing up the lengths of the individual segments making up the route. In this case, the length is 4+4=8. The length of a line segment can be found as described in the example given above for step 202.

Nearest Point Finder

FIG. 4*a* and FIG. 4*b* show a preferred embodiment of the Nearest Point Finder 300. The Nearest Point Finder 300 computes the nearest point distance, which is the distance (measured along the route) to the point on the route nearest to the user's location. The Nearest Point Finder 300 begins at step 402 by initializing the shortest distance as the distance from the user's location to the first point on the route. Next, at step 404, the current point is initialized as the first point in the route. Then, at step 406, the current segment (which is the segment passing from the current point to the next point on the route) is initialized as zero. Next, step 408 checks to see if current point is the last point in the route. If it is, then we're done; otherwise, we continue to step 410. At step 410, the current segment is set equal to a line segment beginning at the current point and ending at the next point on the route.

Next at step 412, we find the distance from the start of the current segment to the point on the segment which is nearest to the user's location. This distance is found as follows. Let vector1 be the vector passing from the start of the current segment to the end of the current segment. Let vector2 be the vector passing from the start of the current segment to the user's location. Then the distance is given by the dot product of vector1 with vector2 divided by the length of the current segment. If this distance is less than zero, then set it equal to zero. If the distance is greater than the length of the segment, then set it equal to the length of the segment.

Next, in step 414, we find the point on the current segment nearest to the user's location. This is accomplished as follows. First, find the vector formed by subtracting the start point of the current segment from the end point. Scale this vector so that it is of length given by the distance calculated in step 412. Next, add this vector to the start point of the current segment. The resulting vector corresponds to the point on the current segment nearest to the user's location.

Next, step 416 sets the current distance equal to the distance from the user's location to the nearest point (found in step 414) on the current segment. Next, step 418 checks to see if the current distance is less than the shortest distance found so far. If it is, then we proceed to step 420 and set the shortest distance equal to the current distance. Then, in step 422, we set the nearest point distance equal to the distance to the current segment (set in step 404 and later in step 426) plus the distance from the start of the current segment found in step 412. Note that the distance computed in step 422 is the desired output of the Nearest Point Finder 300, though the distance may still be updated if a closer point is found later in the process.

Next we move on to step 424. We would have gone directly to step 424 if the flow had gone in the "No" direction at step 418. At step 424, the current point is set equal to the next point on the route. Next, step 426 updates the value of the distance to the current segment by adding on the length of the current segment. Finally, we return to step 408. The process continues looping in this fashion until the last point in the route is reached.

To better understand the Nearest Point Locator 202, consider an example in which the user's location is (1, 1), and the route consists of the sequence of points {(0, 0), (0, 4)}. The Nearest Point Locator 202 begins at step 402 by initializing the shortest distance as the distance from the user's location to first point on the route, which in this case is the distance from (1, 1) to (0, 0). This can be found using the Euclidean distance formula used in step 202. In this case, the distance is the square root of 2 which approximately equals 1.41. Next, step 404 initializes the current point as the first point on the route, which in this case is (0, 0). Next, step 406 initializes the distance to the current segment as 0. Next, step 408 checks to see if the current point is the last point on the route. It is not, so we continue to step 410, which sets the current segment equal to the segment going from the current point to the next point on the route. In this case, the current segment is {(0, 0), (0, 4)} (which happens to be the only segment).

Next at step 412, we find the distance from the start of the current segment to the point on the segment which is nearest to the user's location. This distance is found as follows. Let vector1 be the vector passing from the start of the current segment to the end of the current segment, which in this case is (0, 4). Let vector2 be the vector passing from the start of the current segment to the user's location, in this case (1, 1). Note that these vectors were found by subtracting the end point minus the start point, so for example vector2=(1, 1)−(0, 0)= (1, 1). Next, the distance is given by the dot product of vector1 with vector2 divided by the length of the current segment, which in this case is (0, 4) dotted with (1, 1) divided by 4, which yields (1*0+4*1)/4=4/4=1. If this distance is less than zero, then set it equal to zero. If the distance is greater than the length of the segment, then set it equal to the length of the segment. Neither of these conditionals is true, so the distance remains 1. The segment length of 4 was found using the Euclidean distance formula from step 202.

Next, in step 414, we find the point on the current segment nearest to the user's location. This is accomplished as follows. First, find the vector formed by subtracting the start point of the current segment from the end point, which in this case is (0, 4)−(0, 0)=(0, 4). Scale this vector so that it is of length given by the distance calculated in step 412 i.e. 1. The scaled vector is (0, 4)*1/length=(0, 1), where the length refers to the length of the vector prior to scaling which can be found using the Euclidian formula from step 202. Next, add this vector to the start point of the current segment, yielding (0, 1)+(0, 0)=(0, 1). The resulting vector corresponds to the point on the current segment nearest to the user's location.

Next, step 416 sets the current distance equal to the distance from the user's location (1, 1) to the nearest point on the current segment (0, 1) as found in step 414. This distance is equal to 1, as can be found using the Euclidean distance formula from step 202. Next, step 418 checks to see if the current distance (which is 1) is less than the shortest distance found so far (which is 1.41). It is, so we proceed to step 420 and set the shortest distance equal to 1. Then, in step 422, we set the nearest point distance equal to the distance to the current segment plus the distance from the start of the current segment (from step 412). This sum sets the nearest point distance to 0+1=1.

Next, at step 424, the current point is set equal to the next point on the route, which is (0, 4). Next, step 426 updates the value of the distance to the current segment by adding on the length of the current segment, yielding 0+4=4. The segment length can be found using the Euclidian formula from step 202. Finally, we return to step 408. The current point (0, 4) is the last point on the route, so we are done. In this case, the nearest point distance is 1, as was found in step 422.

Guidance Message Constructor

FIG. 5 shows a preferred embodiment of the Guidance Message Constructor 102. The Guidance Message Constructor 102, takes in an angle as input and returns the guidance message, which is a qualitative description based on the angle, such as "Turn right" or "Turn around" etc. The first step 500 is to adjust the angle to ensure that its values are in within the range +/−180 degrees (e.g. 190 degrees is really just −170 degrees). This angle adjustment can be accomplished using the same method described in step 204. Next, step 502 checks to see if the absolute value of the angle is greater than 120 degrees. If it is, then step 504 sets the guidance message to "Turn around". Otherwise, step 506 checks to see if the angle is greater than the 60 degrees. If it is, then step 508 sets the guidance message to "Turn right". Otherwise, step 510 checks to see if the angle is less than −60 degrees. If it is, then step 512 sets the guidance message to "Turn left". Otherwise, step 514 checks to see if the angle is greater than 30 degrees. If it is, then step 516 sets the guidance message to "Bear right". Otherwise, step 518 checks to see if the angle is less than −30 degrees. If it is, then step 520 sets the guidance message to "Bear left". Otherwise, step 522 sets the guidance message to the empty string (i.e. a string of characters of length zero often denoted " "). It will be appreciated by one skilled in the art that the numerical thresholds used above (e.g. 30 degrees, 60 degrees, and 120 degrees) could be set to other angles in alternate embodiments.

To better understand the Guidance Message Constructor 102, consider an example in which the input angle is −70 degrees. The first step 500 is to adjust the angle to ensure that its values are in within the range +/−180 degrees (e.g. 190 degrees is really just −170 degrees). In this case, the angle is already in the range +/−180, so the angle remains −70 degrees. Next, step 502 checks to see if the absolute value of the angle is greater than 120 degrees. It is not, so step 506 checks to see if the angle is greater than 60 degrees. It is not, so step 510 checks to see if the angle is less than −60 degrees. −70 is in fact less than −60, so step 512 sets the guidance message to "Turn left", and we are done.

Guidance Presenter

FIG. 6 shows a preferred embodiment of the Guidance Presenter 106. The Guidance Presenter 106 takes as input, the guidance message, an angle, the turn distance, and a Boolean value "Turn discovered" which is "True" if the user is being directed towards a turn and "False" otherwise (note if this is "False", then the turn distance input is ignored). The Guidance Presenter 106 begins at step 600 by checking to see if the guidance message is equal to the empty string. If it is, then the flow skips all the way to step 610, where the guidance arrow is displayed on the user's screen (not shown). This arrow is displayed with angle given by the input angle, where for display purposes the angle is assumed to be measured +/−180 degrees from a vector located at the base of the intended arrow location and pointing towards the top of the user's display screen (i.e. +/−180 degrees from vertical). Otherwise, if the guidance message was not equal to the empty string at step 600, then the flow continues to step 602.

Step 602 checks to see if the user is being directed towards a turn (by checking the value of "Turn discovered"). If the user is being directed towards a turn, then the flow skips to step 606. Otherwise, flow continues to step 604. At step 604, the guidance message is appended with the turn distance and the distance units. So, for example, "Turn right" might become "Turn right 20 meters".

Next, step 606 appends a period punctuation mark to the end of the guidance message. Next, step 608 displays the guidance message to the user's screen. Finally, step 610 displays the guidance arrow to the user's screen as described earlier in this section.

To better understand the Guidance Presenter 106, consider an example in which the guidance message is "Turn left", the turn distance is 20, the angle is −70 degrees, the distance units are "meters" and the "Turn discovered" value is "True" The first step 600 checks to see if the guidance message is equal to the empty string. Since it is not, the flow continues to step 602. Step 602 checks to see if the user is being directed towards a turn (by checking the value of "Turn discovered"). Since it is "True", the flow continues to step 604. At step 604, the guidance message is appended with the turn distance and the distance units. So, in this case, "Turn left" becomes "Turn left 20 meters".

Next, step 606 appends a period punctuation mark to the end of the guidance message, which then becomes "Turn left 20 meters.". Next, step 608 displays the guidance message to the user's screen. Finally, step 610 displays the guidance arrow to the user's screen. This arrow is displayed with angle given by the input angle (in this case −70 degrees). Specifically, the arrow is displayed 70 degrees counter-clockwise from the vertical (relative to the user's display screen).

Although in this preferred embodiment guidance information was presented using text and two-dimensional arrows, it will be appreciated by one skilled in the art that many other methods are available to convey orientation and distance information to a user, including three-dimensional arrows, auditory guidance messages, head-mounted displays or tactile pressure.

Turn Analyzer

FIG. 7a and FIG. 7b show a preferred embodiment of the Turn Analyzer 108. The Turn Analyzer 108 begins at step 700. The first step 700 is to round the look-ahead distance so that it is evenly divisible by the sample-length constant, where the sample-length constant is equal to 5 meters in one preferred embodiment. Specifically, this is accomplished using the following equation: rounded distance=ceiling(distance/sample-length constant)*sample-length constant, where "ceiling" is the standard mathematical function for rounding a number up to the next integer (e.g. ceiling(2.3)=3). Next, the Turn Finder 702 finds the next turn in the route. In particular, the Turn Finder 702 returns a line segment (which we will refer to as the turn segment) approximating the route immediately after the next turn. The Turn Finder 702 also returns a Boolean value indicating "True" if a turn was found and "False" otherwise.

Next step 704 checks to see if a turn was discovered by the Turn Finder 702. If a turn was not discovered, then the flow continues to step 706. At this point 706, the Boolean value "Turn discovered" is set equal to "False", and we are done. Otherwise, if a turn was discovered at step 704, then the flow continues to the Angle-Of-Turn Finder 708. The Angle-Of-Turn Finder 708 finds the turn angle i.e. the angle of the turn relative to the user. Next, step 710 checks to see if the turn angle is less than or equal to 30 degrees (to one skilled in the art it will be appreciated that an angle other than 30 degrees could be used instead). If it is, then the turn is taken to be too small to be considered, and the flow moves to step 712. At step 712, the Boolean value turn discovered is set equal to false, and the Turn Analyzer 108 is done. Otherwise, if the turn angle was greater than 30 degrees (in step 710), then the flow continues to the Turn Location Finder 714. The Turn Location Finder 714 is used to find a turn location, i.e. the location at which the user should turn if the user intends to stay on course. Next, step 716 finds the distance from the user's location to the turn location. We refer to this distance as the turn distance. Next, step 718 checks to see if the turn distance is greater than the turn-alert constant (the turn-alert constant is 150 meters in one preferred embodiment). If it is greater, then the turn is considered to be too far in the distance to be of concern, and so the Boolean value, turn discovered, is set equal to "False" at step 720. Otherwise, at step 722, the Boolean value, turn discovered, is set equal to "True".

Turn Finder

FIG. 8a and FIG. 8b shows a preferred embodiment of the Turn Finder 702. The Turn Finder 702 finds a turn segment, which is a line segment approximating the route just after the next turn. The Turn Finder 702 also returns a Boolean value "Turn discovered", which set equal to "True" if a turn is found and "False" otherwise. The first step of the Turn Finder 702 is to use the Route Resampler 800. The Route Re-sampler 800 finds a re-sampled route, which is a route formed from the original route, by starting at the look-ahead point and then sampling uniformly with sample length equal to the sample-length constant (this constant is 5 meters in one preferred embodiment). The remaining steps of the Turn Finder 702 make use of the re-sampled route rather than the original route.

Next, step 802 checks to see if the number of points in the re-sampled route is less than three. If it is, then the Boolean value, "Turn discovered", is set to "False" at step 804, and the Turn Finder 702 is done. Otherwise, flow continues to step 806. Step 806 initializes the current point to the second point in the re-sampled route. Next step 808 checks to see if there are more points (possibly just one) in the re-sampled after the current point. If there are not, then the flow continues to step 810. At step 810, the "Turn discovered" value is set to "False", and the Turn Finder 702 is done. Otherwise, if step 810 found more points, then the flow continues to step 812. Step 812 sets the current point to the next point in the re-sampled route. Next, step 814 sets the current segment to be the line segment beginning at the previous point (i.e. the point in the re-sampled route before the current point) and ending on the current point. Next, step 816 sets the previous segment to begin at the point before the previous point on the re-sampled route and end on the previous point. Next, step 818 sets the current direction equal to the angle of the current segment relative to the user's orientation. To find this angle, first find the vector given by subtracting start point of the segment from the end point. The angle of this vector relative to the user can be found using the same method as was used to find the angle of the vector (x, y) in step 204. Next, step 820 sets the previous direction equal to the angle of the previous segment relative to the user's orientation. This angle can be found using the same method as in step 818. Next, step 822 sets the delta direction equal to the current direction minus the previous direction. Next, step 824 sets the current angle, the previous angle and the delta direction such that they are all in the range +/−180 degrees. This is accomplished using the same method as described in step 204.

Next, step 826 checks to see if the magnitude of the current direction is greater than 30 degrees, and step 826 also checks if the magnitude of the delta direction is less than 10 degrees (to one skilled in the art it will be appreciated that these angle thresholds could be set to values other than 10 and 30). If either of these conditionals is false, then the flow returns to step 808. Otherwise, the flow continues to step 828. Step 828 sets the turn segment equal to the line segment beginning at the point before last (on the re-sampled route) and ending at the current point. Finally, step 830 sets "Turn discovered" to equal "True".

To better understand the Turn Finder 702, consider an example in which the user's location is (−1, 3), the route is given by the sequence of points {(0, 0), (0, 4), (4, 4)}, and the user's orientation is given by 0 degrees from the y-axis. For simplicity, we will assume that the sample-length constant is 1, and the look-ahead constant is 1. Note that in this case the look-ahead distance is 4.

The first step of the Turn Finder 702 is to use the Route Resampler 800. In this case (since the sample-length constant has been set to 1), the Route Re-sampler 800 returns the re-sampled route {(0, 4), (1, 4), (2, 4), (3, 4)}. Notice that the re-sampled route begins look-ahead distance from the start of the route. The remaining steps of the Turn Finder 702 make use of the re-sampled route rather than the original route.

Next, step 802 checks to see if the number of points in the re-sampled route is less than three. It is not, so flow continues to step 806. Step 806 initializes the current point to the second point in the re-sampled route, which is (1, 4). Next, step 808 checks to see if there are more points (possibly just one) in the re-sampled after the current point. There are more points, so the flow continues to step 812. Step 812 sets the current point to the next point in the re-sampled route, which is (2, 4). Next, step 814 sets the current segment to be the line segment beginning at the previous point and ending on the current point. So, the current segment is {(1, 4), (2, 4)}. Next, step 816 sets the previous segment to begin at the point before the previous point on the re-sampled route and end on the previous point. So, in this case, the previous segment is {(0, 4), (1, 4)}. Next, step 818 sets the current direction equal to the angle of the current segment relative to the user's orientation. To find this angle, first find the vector given by subtracting start point of the current segment from the end point, which yields (2, 4)−(1, 4)=(1, 0). The angle of this vector relative to the user can be found using the same method as was used to find the angle of the vector (x, y) in step 204. This yields an angle of 90 degrees relative to the user's orientation. Next, step 820 sets the previous direction equal to the angle of the previous segment relative to the user's orientation. This angle can be found using the same method as in step 818. This also yields the vector (1, 0) with angle 90 degrees. Next, step 822 sets the delta direction equal to the current direction minus the previous direction, which is 90−90=0 degrees. Next, step 824 sets the current angle, the previous angle and the delta direction such that they are all in the range +/−180 degrees. This is accomplished using the same method as described in step 204. The angles are already in this range, so nothing needs to be done for step 824.

Next, step 826 checks to see if the magnitude of the current direction is greater than 30 degrees, and step 826 checks if the magnitude of the delta direction is less than 10 degrees. Since 90 is greater than 30, and 0 is less than 10, the conditional is true; therefore, we continue to step 828. Step 828 sets the turn segment equal to the line segment beginning at the point before last (on the re-sampled route) and ending at the current point. So in this case, the turn segment is {(0, 4), (2, 4)}. Finally, step 830 sets "Turn discovered" to equal "True".

Route Resampler

FIG. 9 shows a preferred embodiment of the Route Resampler 800. The Route Resampler 800 finds a re-sampled route, which is a route formed from the original route, by starting at the look-ahead point and then sampling uniformly with sample length equal to the sample-length constant (this constant is 5 meters in one preferred embodiment). The Route Resampler 800 stops sampling either at the end of the route or when the number of samples reaches the sample-count constant (which is equal to 10 in one preferred embodiment), whichever comes first.

The Route Resampler 800 begins at step 900, by setting the route length equal to the length of the route. This length can be found by adding up the lengths of each of the line segments making up the route. The length of a line segment can be found as described in the example given for step 202. Next, step 902 sets the total length equal to the look-ahead distance added to the product of the sample-length constant with the sample-count constant. Next, step 904 sets the total length equal to whichever is smaller, the route length or the current value of the total length. Next, step 906 initializes the current distance as the look-ahead distance. Next, step 908 initializes the re-sampled route as an empty route. Next, step 910 checks to see if the current distance is less than or equal to the total distance. If it is not, then the Route Resampler 800 is done. Otherwise, the flow continues to step 912. Step 912 sets the current point equal to the point on the route current distance from the start of the route. This point can be found using the same basic method as described for step 202. Next, step 914 appends the current point to the end of the re-sampled route array. Next, step 916 sets the current distance equal to the current distance plus the sample-length constant. At this point, we loop back to step 910.

To better understand the Route Resampler 800, consider an example in which the route is given by the sequence of points {(0, 0), (0, 2)}, and the look-ahead distance is 1. For simplicity, assume that the sample-length constant is 1.

The Route Resampler 800 begins at step 900, by setting the route length equal to the length of the route. This length can be found by adding up the lengths of each of the line segments making up the route. The length of a line segment can be found as described in the example given for step 202. In this case, the route length is 2. Next, step 902 sets the total length equal to the sample-length constant (equal to 1 for this example) multiplied by the sample-count constant. So, the total length equals 1*10=10. Next, step 904 sets the total length equal to whichever is smaller, the route length or the (current value of) total length. Since 2 is smaller than 10, the total length is reduced to 2. Next, step 906 initializes the current distance as the look-ahead distance, which is 1 in this example. Next, step 908 initializes the re-sampled route as an empty route. Next, step 910 checks to see if the current distance is less than or equal to the total distance. Since 1 is less than 2, the flow continues to step 912. Step 912 sets the current point equal to the point on the route current distance (which is 1) from the start of the route. This point can be found using the same basic method as described for step 202. This yields the point (0, 1). Next, step 914 appends the current point to the end of the re-sampled route array, changing the re-sampled route to {(0, 1)}. Next, step 916 sets the current distance equal to the current distance plus the sample-length constant, which equals 1+1=2.

Next, we loop back to step 910. Since the current distance is still less than or equal to the total distance, we continue through the loop another time (i.e. we continue to step 912). Step 912 sets the current point equal to the point that is current distance from the start of the path. This point can be found using the same basic method as described for step 202. In this case, the point which is a distance of 2 from the start is (0, 2). Next, step 914 appends the current point to the end of the re-sampled route array, changing the re-sampled route to {(0, 1), (0, 2)}. Next, step 916 sets the current distance equal to the current distance plus the sample-length constant, which yields 2+1=3. Finally, step 910 checks if the current distance is less than or equal to the total distance. Since 3 is not less than or equal to 2, we are done, and the re-sampled route is {(0, 1), (0, 2)}.

Angle-of-Turn Finder

FIG. 10 shows a preferred embodiment of the Angle-Of-Turn Finder 708. The Angle-Of-Turn Finder 708 begins with step 1000 by finding the turn angle, which is the angle of the turn segment (found by the Turn Finder 702) relative to the user's orientation. This is accomplished by first finding the vector given by subtracting the start point of the turn segment from the end point of the turn segment. Next, the angle of this vector relative to the user can be found using the same method as was used to find the angle of the vector (x, y) relative to the user's orientation in step 204.

Next, step 1002 checks to see if the magnitude of the turn angle is greater than 90 degrees. If it is, the step 1004 sets the turn angle to 90 degrees. If it is not, then step 1006 checks if the magnitude of the turn angle is less than −90 degrees. If it is then step 1008 sets the turn angle to −90.

To better understand the Angle-Of-Turn Finder 708, consider an example in which the turn segment is {(1, 1), (2, 1)}, and the user's orientation is −10 degrees. The Angle-Of-Turn Finder 708 begins with step 1000 by finding the turn angle, which is the angle of the turn segment (the turn segment was found by the Turn Finder 702) relative to the user's orientation. This is accomplished by first finding the vector given by subtracting the start point of the turn segment from the end point of the turn segment, yielding (2, 1)−(1, 1)=(1, 0). Next, the angle of this vector relative to the user can be found using the same method as was used to find the angle of the vector (x, y) relative to the user's orientation in step 204. This gives a turn angle of 100 degrees. Next, step 1002 checks to see if the magnitude of the turn angle is greater than 90 degrees. It is, so the step 1004 sets the turn angle to 90 degrees, and we are done.

Turn Location Finder

FIG. 11 shows a preferred embodiment of the Turn Location Finder 714. The Turn Location Finder 714 computes the turn location by finding the intersection of the user's line of sight with the turn segment. The first step 1100 is to find the line-of-sight segment, which is a line segment of unit length, located at the user's location, with angle given by the user's orientation. The line-of-sight segment can be computed as follows. First, the start of the segment is simply the user's location. Next, the endpoint of the segment is given by:

$$X' = X + \sin(\text{user's orientation})$$

$$Y' = Y + \cos(\text{user's orientation}),$$

where $(X, Y)$ is the start point of the segment, and $(X', Y')$ is the end point. Next, step 1102 finds the turn-segment angle, which is the angle of the turn segment relative to the user's orientation. This can be computed using the same method as step 1000 of the Angle-Of-Turn Finder 708 (note that the reason we don't want to simply use the turn angle output of the Angle-Of-Turn Finder 708 is that that has been restricted to the range +/−90 degrees). Next step 1104 checks if the magnitude of the turn-segment angle is greater than 90 degrees. If it is, then step 1106 removes the component of the turn segment parallel to the line-of-sight segment (leaving only the perpendicular component). This is accomplished as follows. First, set turn vector equal to the end point of the turn segment minus the start point of the turn segment, and set line-of-sight vector equal to the end point of the line-of-sight segment minus the start point of the line-of-sight segment. Then, set the turn vector equal to:

$$\text{turn vector} - \text{dot}(\text{line-of-sight vector}, \text{turn vector}) * (\text{line-of-sight vector}),$$

where $\text{dot}(x, y)$ is the vector dot product of x with y. Next, change the end point of turn segment to the sum of the turn vector with the start point of turn segment. If the magnitude of the turn angle had been less than or equal to 90 degrees in step 1104, then we would have skipped straight to the final step 1108.

Step 1108 finds the turn location as the intersection of the line determined by the turn segment with the line determined by the line-of-sight segment. The intersection of two lines on a plane can be found as follows (using standard methods from linear algebra). First, find the implicit line equation for each line i.e. solve for the coefficients a, b, and c in the equation $a*x + b*y + c = 0$, where the set of (x, y) coordinates satisfying this equation defines the line. These coefficients can be found based on a line segment {(x1, y1), (x2, y2)} as follows. If the absolute value of (y2−y1) is less than the absolute value of (x2−x1), then the coefficients are given by:

$$a = (y2 - y1)/(x2 - x1), b = -1, \text{ and } c = y1 - a*x1.$$

Otherwise, the coefficients are given by:

$$a=-1, b=(x2-x1)/(y2-y1), \text{ and } c=x1-b*y1.$$

Now, suppose that the line equation coefficients for the turn segment are (a1, b1, c1), and the line equation coefficients for the line-of-sight segment are (a2, b2, c2). Then the intersection of these two lines can be found using the following equations:

$$x=(-b2*c1+b1*c2)/(a1*b2-b1*a2)$$

$$y=(a2*c1-a1*c2)/(a1*b2-b1*a2),$$

where (x, y) is the intersection location. In general, before performing the above computation a check should be performed to make sure that the denominators of the above equations are not so small that the (x, y) values are undefined, given the limitations of the computer's precision (this will occur if the lines are parallel or nearly so); however, in our case this is not an issue since the turn segment is never close to parallel with the line-of-sight segment (since step 826 discounts any turn which is within 30 degrees of the line-of-sight). The Turn Location Finder 714 is now done as the turn location is equal to the intersection location (x, y).

To better understand the Turn Location Finder 714, consider an example in which the turn segment is {(1, 2), (2, 1)}, the user's location is (0, 0), and the user's orientation is 0 degrees. The first step 1100 is to find the line-of-sight segment, which is a line segment of unit length, located at the user's location, with angle given by the user's orientation. The line-of-sight segment can be computed as follows. First, the start of the segment is simply the user's location, which is (0, 0) in this case. Next, the endpoint of the segment is given by:

$$X'=X+\sin(\text{user's orientation})=0+\sin(0)=0$$

$$Y'=Y+\cos(\text{user's orientation})=0+\cos(0)=1,$$

where (X, Y) is the start point of the segment, and (X', Y') is the end point. So, the line-of-sight segment is approximately {(0, 0), (0, 1)}. By the way, to reproduce these computations, make sure your sin and cos functions accept degrees; otherwise, convert to radians. Next, step 1102 finds the turn-segment angle, which is the angle of the turn segment relative to the user's orientation. This can be computed using the same method as step 1000 of the Angle-Of-Turn Finder 708. This yields an angle of 135 degrees relative to the user. Next step 1104 checks if the magnitude of the turn-segment angle is greater than 90 degrees. It is, so step 1106 removes the component of the turn segment parallel to the line-of-sight segment (leaving only the perpendicular component). This is accomplished as follows. First, set turn vector equal to the end point of the turn segment minus the start point of the turn segment i.e. (2, 1)−(1, 2)=(1, −1), and set line-of-sight vector equal to the end point of the line-of-sight segment minus the start point of the line-of-sight segment i.e. (0, 1)−(0, 0)=(0, 1). Then, set the turn vector equal to:

$$\text{turn vector}-\text{dot}(\text{line-of-sight vector}, \text{turn vector})*(\text{line-of-sight vector}),$$

where dot(x,y) is the vector dot product of x with y. This equals:

$$(1,-1)-\text{dot}((0,1),(1,-1))*(0,1)=(1,-1)-(-1)*(0,1)=(1,0).$$

Next, change the end point of turn segment to the sum of the turn vector with the start point of turn segment, yielding (1, 0)+(1, 2)=(2, 2). This means that the new turn segment is {(1, 2), (2, 2)}. Notice that it is now perpendicular to the line of sight.

Next, step 1108 finds the turn location by finding the intersection point of the line determined by the turn segment {(1, 2), (2, 2)} with the line determined by the line-of-sight segment {(0, 0), (0, 1)}. Using the equation above, the coefficients of the line equation for the turn segment are ((2−2)/(2−1), −1, 2−0*1)=(0, −1, 2). Likewise for the line-of-sight segment, the coefficients are (−1, (0−0)/(1−0), 0−0*0)=(−1, 0, 0). The intersection point is therefore given by (x, y)=, $$x=((-0)*2+-1*0)/(0*0-(-1)*(-1))=0/-1=0,$$

$$y=((-1)*2-0*(0))/(0*0-(-1)*(-1))=-2/-1=2.$$

So, in this case, the turn location is (0, 2).

The above-described devices and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

While the above description of the present invention includes many specifics, these should not be construed as limitations on the scope of the invention, but rather as an exemplification of one preferred embodiment thereof. Many other variations are possible. Accordingly, the scope of the invention should be determined not by the embodiment(s) illustrated, but by the appended claims and their legal equivalents.

We claim:

1. A computer-implemented method for automatically generating and presenting guidance information to direct a user along an off-road route, the method comprising:
    electronically and automatically identifying with a look-ahead-point finder a point located on said route nearest to a location of said user and identifying a look-ahead point as a point located ahead of said user along said route and located a threshold distance ahead of said nearest point, a look-ahead distance as a distance from a start of said route to said look-ahead point, and a look-ahead angle as an angle to the look-ahead point,
    electronically and automatically checking to see if the user is on track towards the look-ahead point, and if the user is not on track towards the look-ahead point, electronically and automatically with a guidance message constructor receiving the look-ahead angle as an input, returning with the guidance message constructor a guidance message, including a qualitative description of what the user should do to be on track towards the look-ahead point,
    electronically presenting information with a guidance presenter based on the guidance message and look-ahead distance to said user including arrows in order to guide said user towards said look-ahead point, and
    electronically searching with a turn analyzer said route to find a turn in said route, and presenting information with the guidance presenter to said user including an arrow with an angle regarding said turn.

2. The methods of claim 1 wherein said methods are implemented by one or more hardware or software devices or both.

3. The methods of claim 1 wherein said methods are implemented in a computer-readable medium including one or more computer readable instructions embedded therein and configured to cause one or more computer processors to perform the steps of said methods.

4. The method of claim 1 wherein the step of electronically and automatically identifying said look-ahead point includes electronically identifying said look-ahead point as a point on said route located ahead of a point on said route nearest to said user's location.

5. The method of claim 1 wherein the step of electronically searching a route to find a turn includes:
   electronically searching said route to find the location of the next turn in said route, and
   electronically determining the angle of said turn relative to said user.

6. The method of claim 5 wherein the step of electronically searching said route to find the location of the next turn in said route includes:
   electronically determining a starting location on the route at which to begin said search, and
   electronically searching said route, beginning at said starting location, in order to find the location of the next turn on said route.

7. The method of claim 6 wherein the step of electronically determining a starting location on the route at which to begin said search includes electronically setting said starting location equal to a point on said route near to said user's location.

8. The method of claim 6 wherein the step of electronically determining a starting location on the route at which to begin said search includes electronically setting said starting location equal to said look-ahead point.

9. The method of claim 6 wherein the step of electronically searching said route, beginning at said starting location, in order to find the location of the next turn on said route includes:
   electronically searching said route, beginning at said starting location, to find a segment of said route located at the next turn in said route, and
   electronically determining the location of said turn based on said segment.

10. The method of claim 9 wherein the step of electronically determining the location of said turn based on said segment includes electronically determining said turn location as the start, or end, or center point of said segment.

11. The method of claim 9 wherein the step of electronically determining the location of said turn based on said segment includes electronically determining said turn location as the unique intersection of said user's line of sight with the unique line determined by said segment.

12. The method of claim 1 wherein the step of electronically presenting information to said user regarding said turn includes electronically conveying to said user the angle of said turn relative to said user, and/or electronically conveying to said user the distance to said turn from said user.

13. A system for automatically generating and presenting guidance information to direct a user along an off-road route, given said route and a location and orientation of said user as inputs, the system comprising:
   a look-ahead-point finder configured to electronically and automatically identify a point on said route nearest to a location of said user location, and electronically determine a look-ahead point as a point located on said route and located a threshold distance ahead of said nearest point, a look-ahead distance as a distance from a start of said route to said look-ahead point, and a look-ahead angle as an angle to the look-ahead point,
   a track detector configured to electronically and automatically check to see if the user is on track towards the look-ahead point, and if the user is not on track towards the look-ahead point, electronically and automatically with a guidance message constructor receiving the look-ahead angle as an input, return with the guidance message constructor a guidance message, including a qualitative description of what the user should do to be on track towards the look-ahead point,
   a guidance presenter for presenting information based on the guidance message and look-ahead distance to said user including arrows in order to guide said user towards said look-ahead point, and
   a turn analyzer for electronically searching said route to find a turn in said route, and presenting information with the guidance presenter to said user including an arrow with an angle regarding said turn.

14. The system of claim 13 wherein said guidance presenter is configured to electronically convey to said user the angle of said look-ahead point relative to said user.

15. The system of claim 13 wherein said turn analyzer includes:
   a turn finder to search said route and find a segment, referred to as a turn segment, of said route located at the next turn in said route,
   a turn location finder for determining a turn location corresponding to said turn segment, and
   an angle-of-turn finder for finding the angle of said turn as the angle of said turn segment relative to said user's orientation.

16. The system of claim 15 wherein said turn location finder is configured to electronically determine said turn location as the start, or end, or center point of said turn segment.

17. The system of claim 15 wherein said turn location finder is configured to electronically determine said turn location as the unique intersection of said user's line of sight with the unique line determined by said turn segment.

18. The system of claim 13 wherein said guidance presenter is configured to electronically determine if said user is heading approximately towards said look-ahead point, and if said user is not heading approximately towards said look-ahead point, then electronically convey to said user the angle of said look-ahead point relative to said user, and otherwise if said user is heading approximately towards said look-ahead point, then electronically determine if said turn analyzer successfully discovered a turn, and if said turn analyzer successfully discovered a turn, then electronically convey to said user the angle of said turn relative to said user.

19. A computer program product for automatically generating and presenting guidance information to direct a user along an off-road route, and including one or more computer readable instructions embedded on a tangible, non-transitory computer readable medium, and configured to cause one or more computer processors to perform the steps of
   electronically and automatically identifying with a look-ahead-point finder a point located on said route nearest to a location of said user and identifying a look-ahead point as a point located ahead of said user along said route and located a threshold distance ahead of said nearest point, a look-ahead distance as a distance from a start of said route to said look-ahead point, and a look-ahead angle as an angle to the look-ahead point,
   electronically and automatically checking to see if the user is on track towards the look-ahead point, and if the user is not on track towards the look-ahead point, electronically and automatically with a guidance message constructor receiving the look-ahead angle as an input, returning with the guidance message constructor a guidance message, including a qualitative description of what the user should do to be on track towards the look-ahead point, electronically presenting information with a guidance presenter based on the guidance message and look-ahead distance to said user including arrows in order to guide said user towards said look-ahead point, and electronically searching with a turn analyzer said route to find a turn in said route, and presenting information with the guidance presenter to said user including an arrow with an angle regarding said turn.

20. The computer program product of claim 19 wherein the step of electronically and automatically identifying said look-ahead point includes electronically identifying said look-ahead point as a point on said route located ahead of a point on said route nearest to said user's location.

21. The computer program product of claim 19 wherein the step of electronically searching a route to find a turn includes:
electronically searching said route to find the location of the next turn in said route, and
electronically determining the angle of said turn relative to said user.

22. The computer program product of claim 21 wherein the step of electronically searching said route to find the location of the next turn in said route includes:
electronically determining a starting location on the route at which to begin said search, and
electronically searching said route, beginning at said starting location, in order to find the location of the next turn on said route.

23. The computer program product of claim 22 wherein the step of electronically determining a starting location on the route at which to begin said search includes electronically setting said starting location equal to a point on said route near to said user's location.

24. The computer program product of claim 22 wherein the step of electronically determining a starting location on the route at which to begin said search includes electronically setting said starting location equal to said look-ahead point.

25. The computer program product of claim 22 wherein the step of electronically searching said route, beginning at said starting location, in order to find the location of the next turn on said route includes:
electronically searching said route, beginning at said starting location, to find a segment of said route located at the next turn in said route, and
electronically determining the location of said turn based on said segment.

26. The computer program product of claim 25 wherein the step of electronically determining the location of said turn based on said segment includes electronically determining said turn location as the start, or end, or center point of said segment.

27. The computer program product of claim 25 wherein the step of electronically determining the location of said turn based on said segment includes electronically determining said turn location as the unique intersection of said user's line of sight with the unique line determined by said segment.

28. The computer program product of claim 20 wherein the step of electronically presenting information to said user regarding said turn includes electronically conveying to said user the angle of said turn relative to said user, and/or electronically conveying to said user the distance to said turn from said user.

* * * * *